(12) United States Patent
Kobayashi et al.

(10) Patent No.: US 7,561,788 B2
(45) Date of Patent: Jul. 14, 2009

(54) IMAGE-CAPTURING DEVICE HAVING MULTIPLE OPTICAL SYSTEMS

(75) Inventors: Masao Kobayashi, Nagano (JP); Taro Kushida, Nagano (JP)

(73) Assignee: Eastman Kodak Company, Rochester, NY (US)

( * ) Notice: Subject to any disclaimer, the term of this patent is extended or adjusted under 35 U.S.C. 154(b) by 440 days.

(21) Appl. No.: 11/365,346

(22) Filed: Mar. 1, 2006

(65) Prior Publication Data

US 2007/0058961 A1 Mar. 15, 2007

(30) Foreign Application Priority Data

Sep. 9, 2005 (JP) ............................. 2005-262829

(51) Int. Cl.
*G03B 17/00* (2006.01)
*G03B 13/14* (2006.01)
(52) U.S. Cl. ........................................ 396/88; 396/377
(58) Field of Classification Search ................. 396/88, 396/322, 325, 333, 373, 374, 377, 378; 348/222.1, 348/333.09, 341
See application file for complete search history.

(56) References Cited

U.S. PATENT DOCUMENTS 6,577,821 B2 * 6/2003 Malloy Desormeaux .... 396/374

FOREIGN PATENT DOCUMENTS

JP 8022049 1/1996
JP 2003298919 10/2003

* cited by examiner

*Primary Examiner*—Rodney E Fuller
(74) *Attorney, Agent, or Firm*—Pamela R. Crocker

(57) ABSTRACT

In an image-capturing device having multiple optical systems, power consumption is reduced and operativity by the user is improved. The image-capturing device has an optical system having a relatively wide angle of view, and an optical system having a relatively narrow angle of view. An image processing system displays an image obtained by the optical system on a display device, crops, from the image of the optical system, an image corresponding to an image-capturing area according to an amount of operation of a zoom operation lever by the user, and displays the cropped image on the display device. When the user operates a release button, the image processing system and a lens control system drive the optical system to an angle of view corresponding to the image-capturing area and stores an image obtained by the optical system in a storage device.

6 Claims, 10 Drawing Sheets

IMAGE-CAPTURING DEVICE HAVING MULTIPLE OPTICAL SYSTEMS

FIELD OF THE INVENTION

The present invention relates to an image-capturing device and, more particularly, to an image-capturing device having multiple optical systems.

Conventionally, digital cameras having multiple optical systems have been proposed. For example, Japanese Patent Laid-Open Publication No. 2003-298919 discloses formation of an image by synthesizing, in an image-complementing unit, a high-quality image having a narrow angle of view and which can be optically zoomed, and a low-quality image having a wide angle of view, the high-quality image and the low-quality image being obtained by combinations of a CCD having a small size and a high pixel density and a zoom lens, and a CCD having a large size and a low pixel density and a lens. This reference also discloses switching of an optical path from each lens to each CCD to thereby change the combination of the lens and CCD.

Japanese Patent Laid-Open Publication No. Hei 8-22049 discloses that, in order to obtain a finder viewing area corresponding to an image-capturing range which differs among image-capturing modes, a focus-adjusting member is adjusted to a normal image-capturing mode when the image-capturing person manually sets a position for normal image-capturing in which an optical axis of an image-capturing block and an optical axis of a finder block are approximately parallel to each other and the focus-adjusting member is adjusted to a close-distance image-capturing mode when the user moves to a leaning position for close-distance image-capturing.

In this manner, a wide range of angles of view can be handled by combining an optical system having a relatively wide angle of view and an optical system having a relatively narrow angle of view. However, a structure in which multiple optical systems are driven results in increased power consumption. Even when an image-capturing device in which multiple optical systems are alternately driven is employed, desire arises for an image-capturing device which allows a user to easily obtain a desired image; in particular, an image of a composition intended by the user, by taking advantage of characteristics of the multiple optical systems. Although Japanese Patent Laid-Open Publication No. Hei 8-22049 discloses changing an optical axis, this reference fails to disclose adjustment with a zoom lens.

SUMMARY OF THE INVENTION

The present invention advantageously provides an image-capturing device having multiple optical systems in which power consumption is reduced and which allows a user to obtain an image intended by the user; in particular, an image of a composition intended by the user.

According to one aspect of the present invention, there is provided an image-capturing device having multiple optical systems, the image-capturing device including a first optical system having a relatively wide angle of view, a second optical system placed in a certain distance from the first optical system and having a relatively narrow angle of view, and a display unit which displays an image obtained by the first optical system, the image-capturing device comprising a first operation unit which inputs a desired angle of view; a display control unit which crops, from an image displayed on the display unit, an image-capturing region calculated in consideration of parallax determined from the desired angle of view input from the first operation unit and a distance between an optical axis of the first optical system and an optical axis of the second optical system and displays the cropped image-capturing region; a second operation unit which inputs an image-capturing instruction; and a storage unit which stores an image obtained by the second optical system corresponding to the image-capturing region as a captured image in response to an image-capturing instruction input from the second operation unit.

According to another aspect of the present invention, there is provided an image-capturing device having multiple optical systems, comprising a display unit which sets an optical system among the multiple optical systems having the widest angle of view as an observing optical system and displays an image obtained by the observing optical system; a zoom operation unit which inputs a zoom operation; a release operation unit which inputs a release operation; a display control unit which sets an optical system among the multiple optical systems having an angle of view corresponding to an angle of view according to the zoom operation as an image-capturing optical system, crops, from the image obtained by the observing optical system, an angle of view corresponding to the zoom operation in consideration of parallax between the observing optical system and the image-capturing optical system and displays the cropped angle of view on the display unit; and a control unit which drives the image-capturing optical system according to the release operation so that the angle of view of the image-capturing optical system matches the cropped angle of view and which then captures an image.

According to the present invention, because an image obtained by an optical system having a relatively wide angle of view is displayed and an image corresponding to an angle of view desired by the user is displayed using the image obtained by the optical system having a relatively wide angle of view, the other optical systems do not need to be driven during this period, whereby power consumption can be reduced. In addition, because an image-capturing region is displayed in consideration of parallax, an image of a composition intended by the user can be obtained. Moreover, because an image of an optical system suitable for the angle of view desired by the user is obtained during image-capturing, a high-quality image can be obtained.

BRIEF DESCRIPTION OF THE DRAWINGS

Preferred embodiments of the present invention will be described in detail by reference to the drawings, wherein.

DETAILED DESCRIPTION OF THE INVENTION

Figure 1:
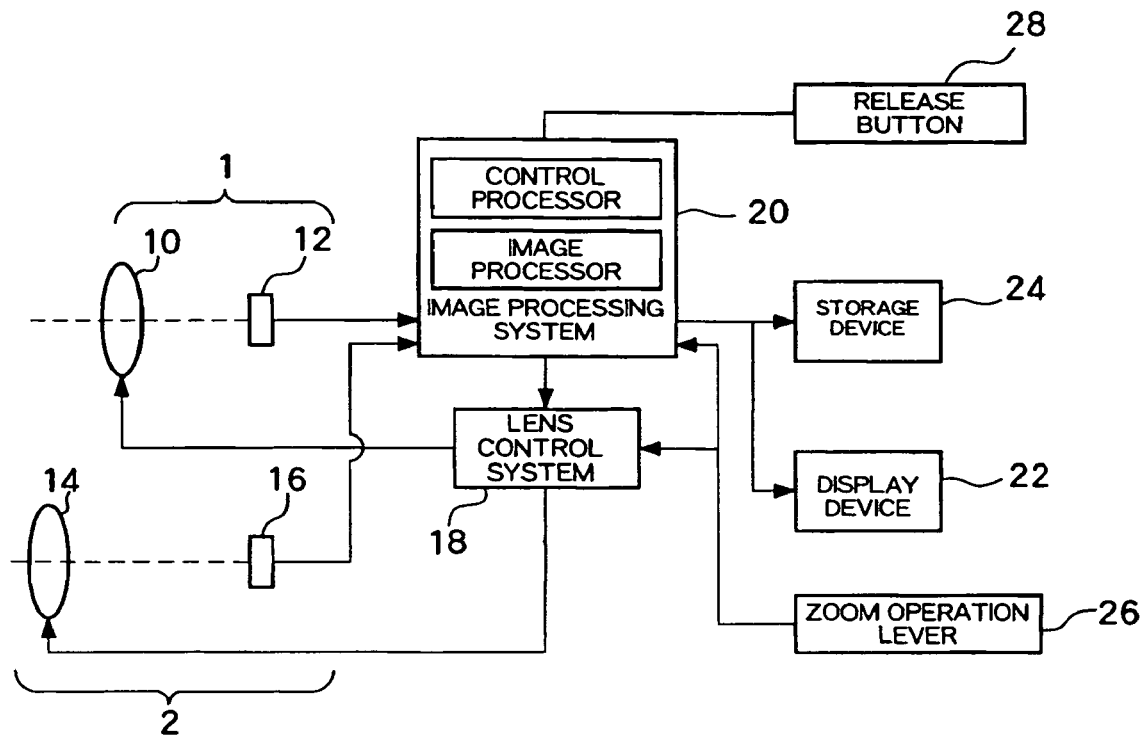
FIG. 1 is a block diagram showing a structure of a first preferred embodiment of the present invention.

Preferred embodiments of the present invention will now be described referring to the drawings.

FIG. 1 is a block diagram showing the structure of a digital camera according to a first preferred embodiment of the present invention. The digital camera comprises an optical system 1 and an optical system 2 as multiple optical systems. The optical system 1 has a relatively wide angle of view and the optical system 2 has a relatively narrow angle of view. The optical systems 1 and 2 are placed a predetermined distance apart in a vertical direction of the digital camera.

The optical system 1 comprises a fixed focal length lens 10 and an image sensor 12. The fixed focal length lens 10 is, for example, a wide angle lens having a 35 mm film equivalent focal length of 22 mm. The image sensor 12 is a single-chip color mega-pixel image sensor including a CCD and a CMOS and uses well-known Bayer color filters for capturing color images. An image signal (a first image signal) obtained by the image sensor 12 is supplied to an image processing system 20.

The optical system 2 comprises a zoom lens 14 and an image sensor 16. The zoom lens 14 is a zoom lens having, for example, a 35 mm film equivalent focal length of 40 mm-120 mm. Similar to the image sensor 12, the image sensor 16 comprises a CCD and a CMOS. The image sensors 12 and 16 are of identical size in the present embodiment, but may be of different sizes. An image signal (a second image signal) obtained by the image sensor 16 is also supplied to the image processing system 20.

A zoom operation lever 26 and a release button 28 are provided as operation units for the user at predetermined positions on the digital camera. The zoom lever 26 is a lever for allowing a user to set a desired angle of view, and zoom can be set both in a zoom-in direction and a zoom-out direction. When the user operates on the zoom operation lever 26, an operation signal is supplied to the image processing system 20. The release button 28 is a button for allowing the user to input his intent for capturing an image. In a state of halfway down (S1), auto-focusing function is executed and in a state of completely down (S2), an image is captured and recorded. When the user operates on the release button 28, an operation signal is supplied to the image processing system 20.

A lens control system 18 controls zoom and focusing of the optical system 1 and the optical system 2.

Figure 14A:
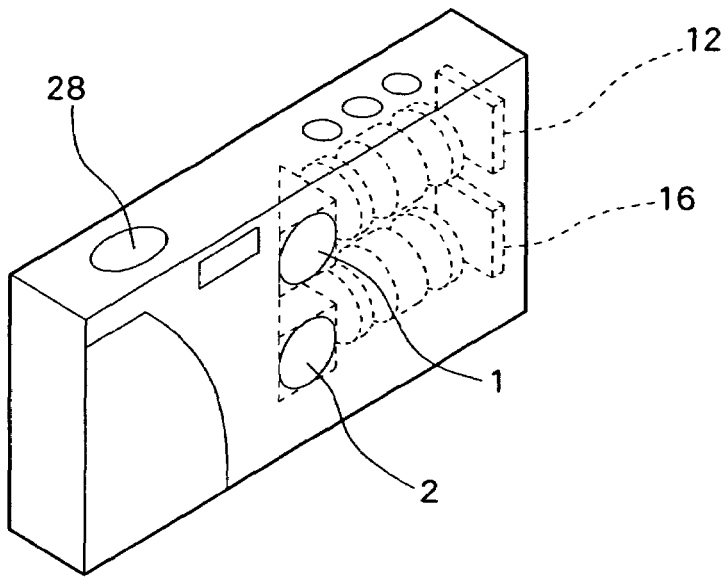
FIG. 14A is a front perspective view of a digital camera.
Figure 14B:
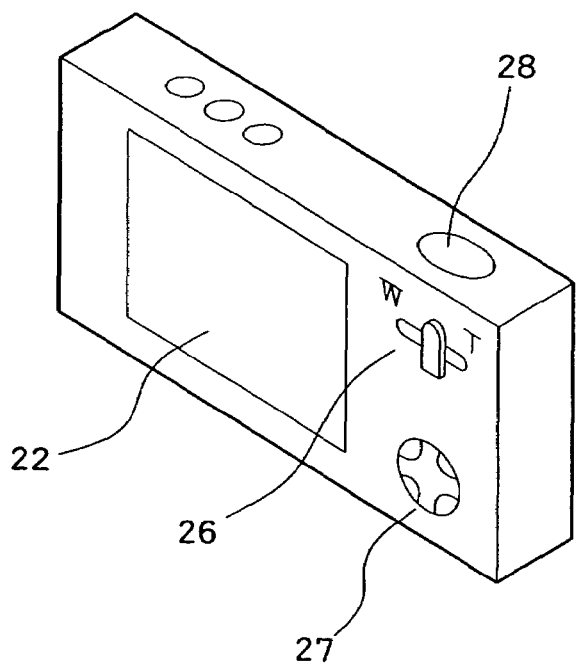
FIG. 14B is a rear perspective view of the digital camera.

The image processing system 20 comprises a control processor and an image processor. The control processor controls various components according to various operation signals input from the user, including the zoom operation signal and the release operation signal. The image processor processes the first image signal supplied from the optical system 1 and the second image signal supplied from the optical system 2. Specifics of the image processing in the image processor are well known, and processes such as an analog/digital conversion process, a white balance adjusting process, and gamma correction are executed to generate sRGB image data. The image processing system 20 of the first preferred embodiment processes the first image signal from the optical system 1 to display an image on a display device 22 such as a color LCD in response to an operation of the zoom operation lever 26 by the user. The image processing system 20 also processes one of the first image signal from the optical system 1 and the second image signal from the second optical system 2 according to an operation of the release button 28 and stores the processed image signal in a storage device 24 as captured image data. The storage device 24 may be an external memory or an internal memory. As an external memory, compact flash (registered trademark), smart media, memory stick, SD memory card format, etc. may be used. As an internal memory, a non-volatile memory such as flash EPROM may be used. FIGS. 14A and 14B show external views of a digital camera. As shown in FIG. 14A, each of the optical system 1 and the optical system 2 is formed as a bent optical system having a right-angle prism. With such a configuration, the thickness of the digital camera can be reduced. As shown in FIG. 14B, the display device 22 such as the LCD is placed at the rear side of the digital camera, and the zoom operation lever 26 and a cross-shaped key 27 are also placed on the rear side of the digital camera. The zoom operation lever 26 has a lever that can be operated to the wide angle side (W) and the telephoto side (T). The user slides the lever to the wide angle side (W) or the telephoto side (T) to input a desired angle of view. The cross-shaped key 27 is operated in order to set various modes of the digital camera or to browse through the captured images.

In the first preferred embodiment, one of the two optical systems 1 and 2 is set as an observing optical system, and the other is used as an image-capturing optical system. The observing optical system is an optical system whose primary function is to allow the user to determine a desired composition. An image obtained by the observing optical system is displayed on the display device 22 as a preview image. The image-capturing optical system is an optical system for obtaining a captured image. When the user who has viewed the image displayed on the display device 22 and determined the composition operates the release button 28, an image obtained by the image-capturing optical system is recorded in the storage device 24 as a captured image. In general, an optical system having a relatively wide angle of view (an optical system having the widest angle of view when more than two optical systems are provided) is used as the observing optical system, and an optical system having a relatively narrow angle of view is used as the image-capturing optical system. This configuration, however, is only exemplary and the determination of which optical system is to be used as the image-capturing optical system is appropriately selected by the control processor of the image processing system 20 based on the amount of operation of the zoom operation lever by the user; that is, the angle of view desired by the user.

Figure 2:
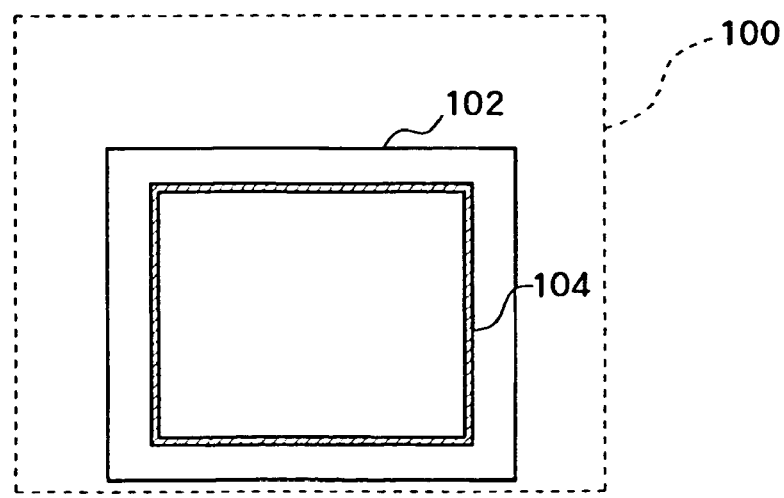
FIG. 2 is an explanatory diagram showing a relationship between an angle of view of an observing optical system and an image-capturing area in the first preferred embodiment of the present invention.

FIG. 2 schematically shows a screen which is displayed on the display device 22 when the optical system 1 is used as the observing optical system and the optical system 2 is used as the image-capturing optical system. When the power of the digital camera is ON, an angle of view 100 obtained by the optical system 1 serving as the observing optical system (angle of view of the observing optical system) is displayed on the screen of the display device 22. When the user operates the operation lever 26 to zoom in, to obtain a desired angle of view, the control processor and image processor of the image processing system 20 calculates an angle of view corresponding to the amount of operation of the zoom operation lever 26, crops, from the first image obtained by the optical system 1, an angle of view corresponding to the amount of operation of the zoom operation lever 26, and displays, on the display device 22, an image obtained by enlarging the cropped image according to the amount of operation of the zoom operation lever 26. Alternatively, instead of displaying the angle of view corresponding to the amount of operation of the zoom operation lever 26, it is also possible to display, in addition to the angle of view corresponding to the amount of operation, an angle of view having a predetermined margin. In FIG. 2, an angle of view 102 is an angle of view having a predetermined margin, and an angle of view 104 is an angle of view corresponding to the amount of operation of the zoom operation lever 26, which is an image-capturing angle of view with which an image is to be captured when the user presses the release button 28 all the way down. The angles of view are hereinafter referred to as "image-capturing area" 102 (or 104). Because the optical system 1 has the fixed focal length lens 10 and the optical system 2 has the zoom lens 14, it may be considered to adjust the zoom lens 14 of the optical system 2 corresponding to an amount of operation of the zoom operation lever 26 when the user operates the zoom operation lever 26 and to display the image obtained by the optical system 2 on the display device 22 (in this configuration, the optical system 2 serves as the observing optical system and, at the same time, serves as the image-capturing optical system). However, normally, the user frequently operates the zoom operation lever 26 in order to obtain a desired composition, and, therefore, the power consumption when the angle of view is adjusted is increased. In addition, because the user can only view on the screen of the display device 22 the angle of view after the zoom operation lever is operated, it is difficult for the user to understand which composition he or she user is working with within the overall image. On the other hand, in the configuration in which an angle of view is calculated according to an amount of operation of the zoom operation lever 26 by the user, an angle of view obtained by the calculation is cropped out (trimmed) from an image of the optical system 1, which is an observing optical system having a wide angle of view, and the cropped angle of view is enlarged and displayed on the display 22, the zoom lens 14 of the optical system 2 does not need to be driven when the angle of view is adjusted, and, thus, the increase in the power consumption can be inhibited.

The driving of the optical system 2 may be performed by driving the zoom and focus of the optical system 2 so that the angle of view matches the angle of view of the observing optical system based on distance information obtained by the optical system 1 and information on amount of operation of the zoom operation lever 26 when the user determines the composition and presses the release button 28. By virtue of this structure, power consumption can be suppressed, and, at the same time, effective image-capturing is achieved by utilizing in one of the two optical systems the information obtained by the other optical system. In addition, because a cropped and enlarged image is displayed in an overlapping manner on an image of a wide angle of view obtained by the optical system 1, which is the observing optical system, the user can easily grasp the composition in the overall image which is currently obtained, and, consequently can easily adjust the angle of view. Moreover, because an angle of view which is slightly larger than the actual image-capturing angle of view is displayed and an image-capturing angle of view is displayed in this angle of view, an accurate image-capturing angle of view can be recognized while the user observes the surroundings of the image-capturing angle of view. Thus, preferable determination of composition is facilitated in particular scenes such as framing of a scene, sporting events involving active movements, etc.

In the first preferred embodiment, the optical system 1 is set as the observing optical system and the optical system 2 is set as the image-capturing optical system, and, therefore, the observing optical system and the image-capturing optical system differ from each other. Thus, when the image-capturing area 104 (and the area 102 having a predetermined margin added to the image-capturing area 104) is to be displayed on the display device 22 with the observing optical system, the parallax caused by the placements of the optical system 1 and the optical system 2 must be considered.

Figure 3A:
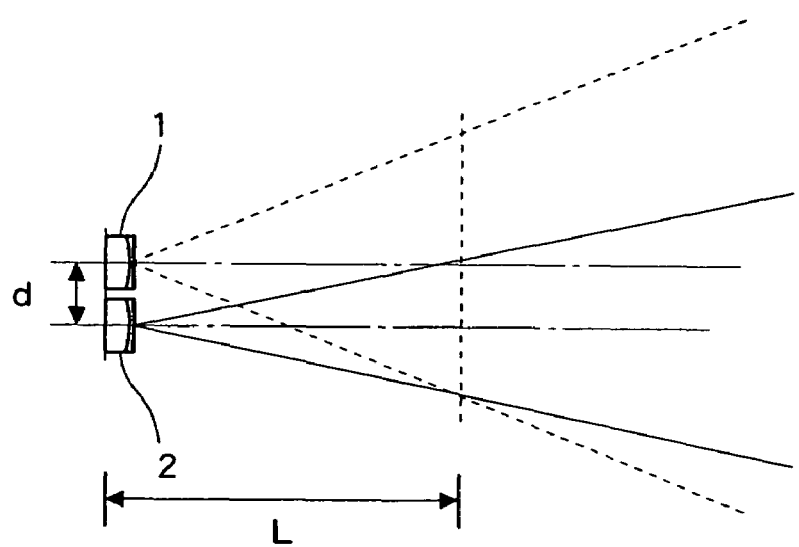
FIG. 3A is a diagram for explaining parallax between an optical system 1 and an optical system 2.
Figure 3B:
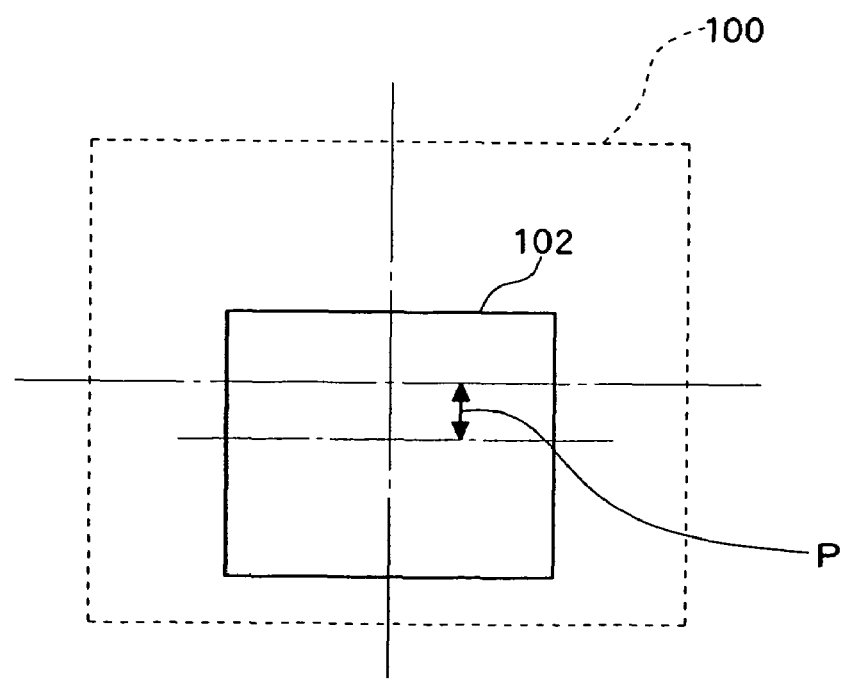
FIG. 3B is a diagram for explaining parallax between the optical system 1 and the optical system 2 on a screen.

FIGS. 3A and 3B show a parallax P caused by the placements of the optical system 1 and the optical system 2. Because the optical system 2 is placed below the optical system 1 with a separation of a distance d, the positions of the angle of view obtained by the optical system 1 and that obtained by the optical system 2 are vertically shifted from each other. Therefore, when an image of an angle of view corresponding to an amount of operation of the zoom operation lever 26 is to be cropped and displayed from an image captured by the optical system 1, which is the observing optical system, the angle of view must be corrected by the parallax P. When a distance to the target is L and the focal length of the optical system 2 is f, the parallax P can be calculated as $P = d \times f / L$. The control processor and the image processor of the image processing system 20 calculate the parallax P from the distance to the target, determine the image of the angle of view to be cropped from the optical system 1 which serves as the observing optical system, and display the cropped image.

Because the parallax P changes depending on the distance to the target as described above and increases as the distance to the target becomes smaller, image-capturing becomes impossible when the parallax P exceeds the range of the initial angle of view of the optical system 1 serving as the observing optical system. Therefore, it is preferable to set the optical axis of the optical system 1 and the optical axis of the optical system 2 so that the optical axes are not parallel to each other, but cross each other.

Figure 4A:
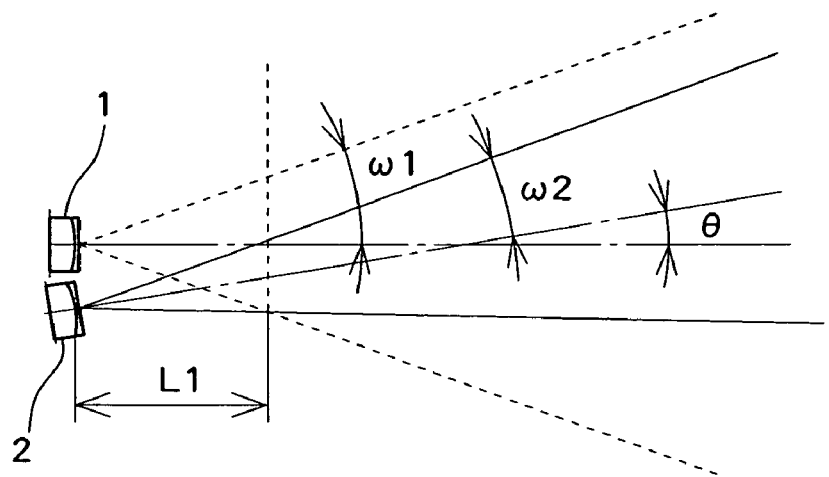
FIG. 4A is a diagram for explaining a crossing angle of optical axes of the optical system 1 and the optical system 2.
Figure 4B:
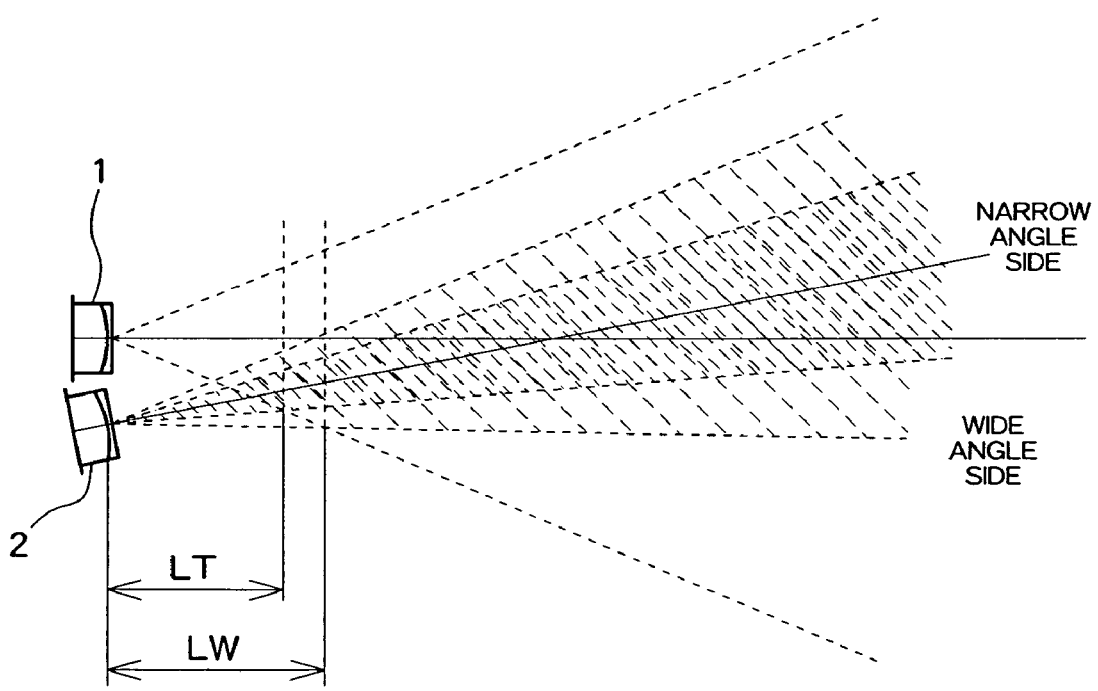
FIG. 4B is a diagram for explaining a crossing angle of optical axes of the optical system 1 and the optical system 2.
Figure 5A:
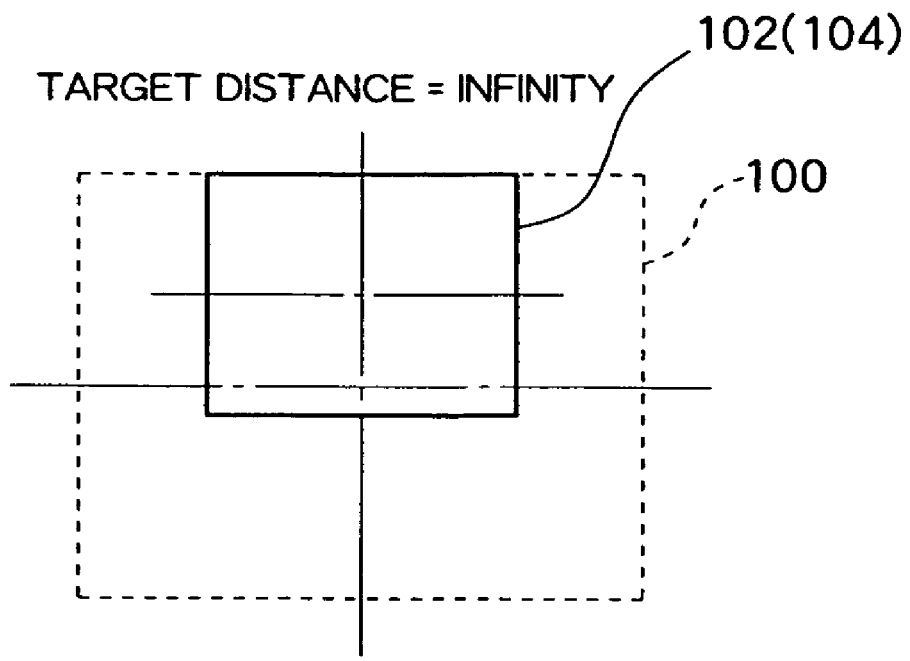
FIG. 5A is a diagram for explaining a relationship between an angle of view of an observing optical system and an image-capturing area when a target distance is infinite.
Figure 5B:
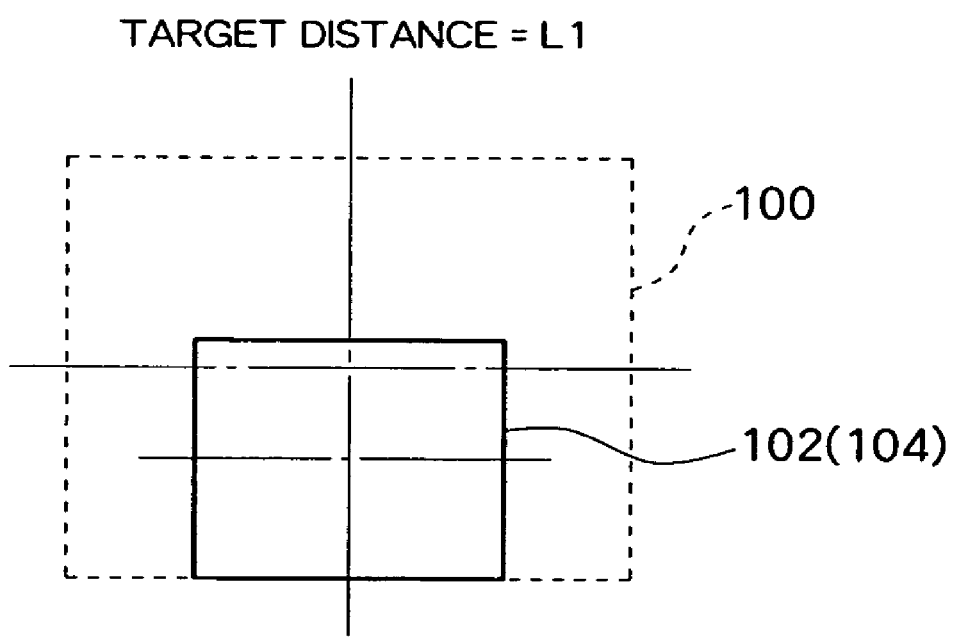
FIG. 5B is a diagram for explaining a relationship between an angle of view of an observing optical system and an image-capturing area when a target distance is a closest distance.

FIG. 4A shows a crossing angle θ of optical axes of the optical system 1 and the optical system 2 in the first preferred embodiment. When ½ of the angle of view of the optical system 1 is ω1 and ½ of the widest angle of view of the optical system 2 is ω2, the crossing angle θ is set as $\theta = \omega 1 - \omega 2$. In FIG. 4A, the optical axis of the optical system 1 is placed in the horizontal plane and the optical axis of the optical system 2 is set to be pointing toward the upper portion of the drawing so as to achieve the crossing angle θ of the optical axes. Because the optical axes of the two optical systems are set in this manner, a closest distance L1 in which the parallax P falls within the angle of view of the optical system 1 becomes $L1 = d / \{\tan \omega 1 - \tan(\omega 2 - \theta)\}$, and, thus, the closest distance can be shortened as compared with the case in which the optical axes of the two optical systems are parallel to each other, allowing for macro-image-capturing at a closer distance. The optical system 2 has a zoom lens, and the angle of view can be changed. As shown in FIG. 4B, when the closest distance at the side of the wide angle of view of the optical system 2 is LW and the closest distance at the side of a narrow angle of view of the optical system 2 is LT, it is clear that LT<LW, and, thus, the numerical value of the angle of view at the widest angle of the optical system 2 is used as $\omega 2$ for efficient shortening of the closest distance. The term d denotes vertical spacing between the optical system 1 and the optical system 2. FIG. 5A shows a positional relationship between the angle of view 100 of the optical system 1 and the image-capturing angle of view 102 (or 104) at a target distance of infinity, and FIG. 5B shows a positional relationship between the angle of view 100 of the optical system 1 and the image-capturing angle of view 102 (or 104) at a target distance of L1. The digital camera of FIG. 4 can capture an image of a target within a distance range of L1 to infinity.

Figure 6:
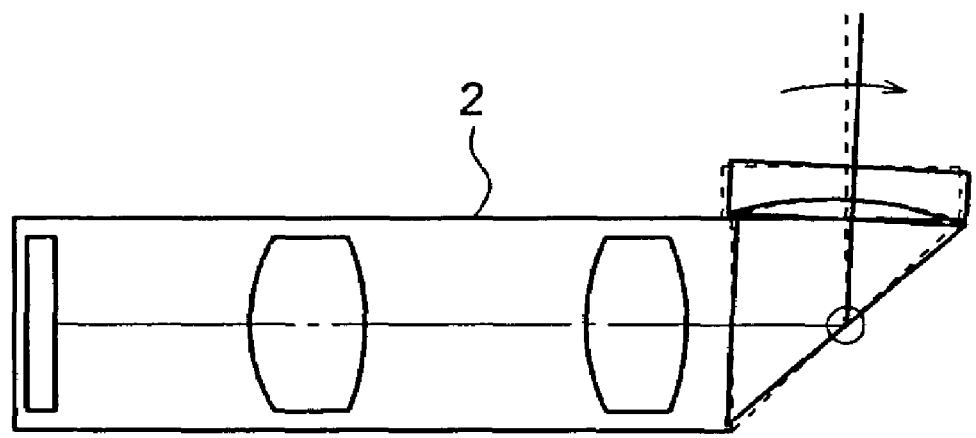
FIG. 6 is a diagram for explaining an optical axis correction.
Figure 7:
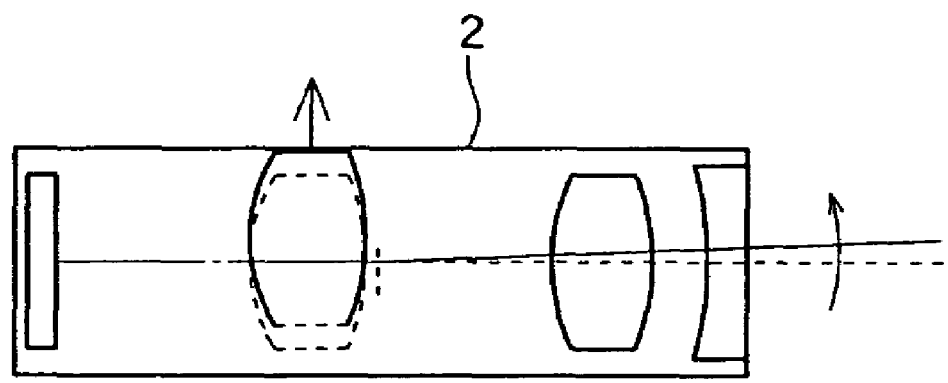
FIG. 7 is another diagram for explaining an optical axis correction.

Because a driving mechanism for driving the optical axis of the optical system 1 or the optical system 2 is provided, image-capturing at an even closer distance is possible. In other words, when the distance to the target becomes the closest distance L1 or less, one of the optical axes of the optical system 1 and the optical system 2 is driven so that the crossing angle $\theta$ between the optical axes of the two optical systems is further increased. For example, when the crossing angle is initially set to $\theta 1$ and the crossing angle obtained when at least one of the optical axes of the optical system 1 and the optical system 2 is driven during macro-image-capturing is $\theta 2$, the optical axis is driven once so that 5 (deg)< ($\theta 1-\theta 2$)<20 (deg). This limitation is provided because the shortening effect of the closest distance is insignificant when the difference between $\theta 2$ and $\theta 1$ is less than or equal to 5 degs and the configuration where the difference between $\theta 2$ and $\theta 1$ being greater than or equal to 20 degs causes an excessively abnormal feeling due to observation of the target from a tilted direction, which is not desirable during image capturing. The switching timing of the crossing angle $\theta$ from $\theta 1$ to $\theta 2$ may be set at the point when the target distance becomes sequentially smaller and reaches L1, or immediately before this point, or may be set at the timing when the user sets the image-capturing mode to macro mode. When the image-capturing mode is set to the macro mode due to the user's operation, the control processor of the image processing system 20 changes at least one of the optical axis of the optical system 1 and the optical axis of the optical system 2 accordingly, to thereby change the crossing angle $\theta$ from $\theta 1$ to $\theta 2$. The method of driving the optical axis is arbitrary, and the optical axis may be driven, for example, by driving an objective lens of the optical system 2, which is a bent optical system as shown in FIG. 6, or may be driven by driving a light lens of a plurality of lenses as shown in FIG. 7.

Figure 8:
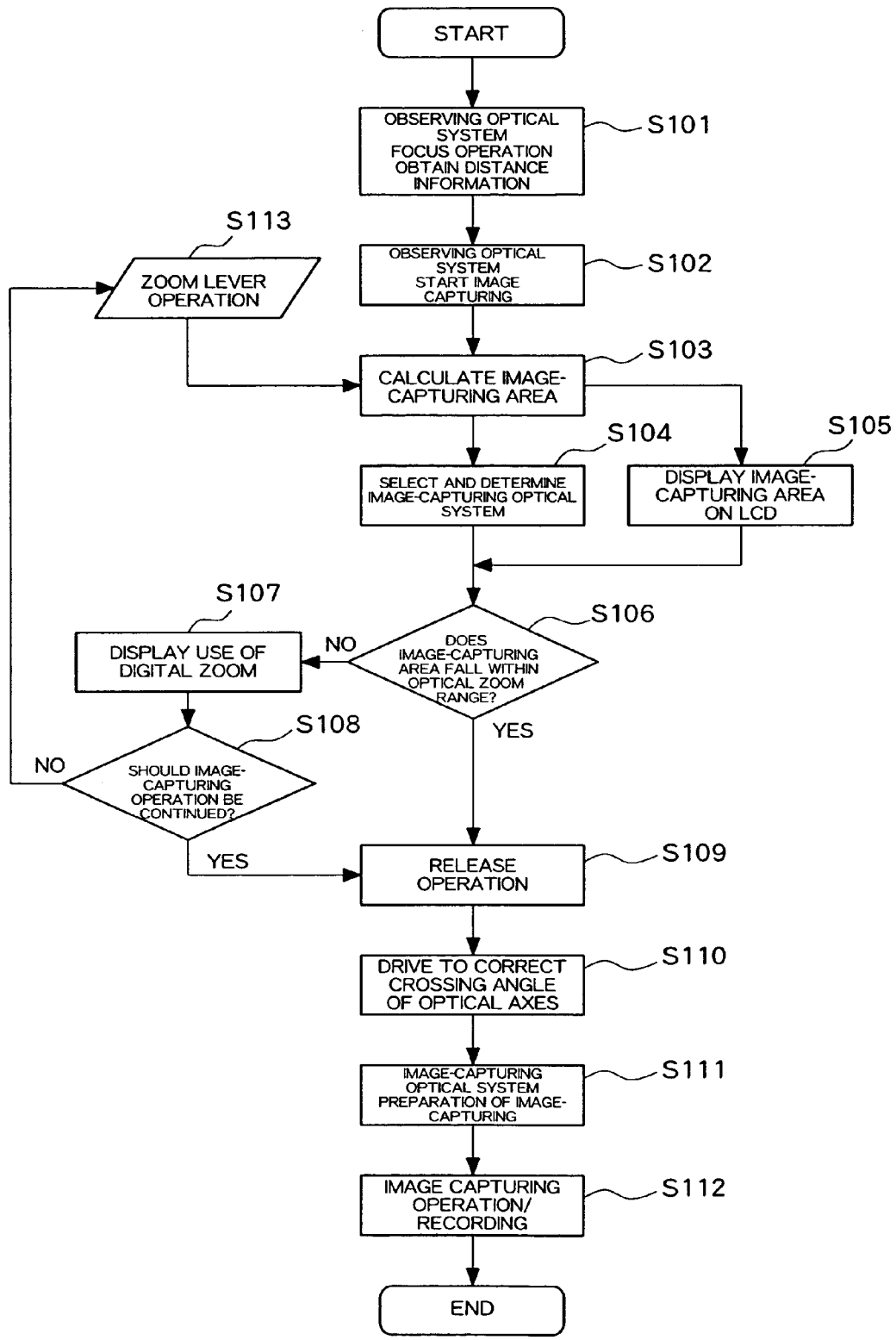
FIG. 8 is a flowchart of processing of the first preferred embodiment.

FIG. 8 shows a processing flowchart of the first preferred embodiment. When the power of the digital camera is switched ON, the control processor of the image processing system 20 drives the optical system 1 serving as the observing optical system and performs an auto-focus operation and exposure control using the optical system 1 to thereby obtain distance measurement information and light measurement information (S101). Then, an image of the target is captured by the optical system 1 and displayed on the display device 22 (S102).

When the user operates the zoom operation lever 26 in order to obtain a desired angle of view (S113), the control processor of the image processing system 20 calculates an angle of view corresponding to the amount of operation of the zoom operation lever 26 (image-capturing area calculation: S103). The amount of operation of the zoom operation lever 26 and the angle of view (or change magnification) are in a one-to-one relationship. When the angle of view desired by the user (image-capturing area) is calculated, the image processor of the image processing system crops an image portion corresponding to the calculated angle of view from the image of the optical system 1 according to an instruction from the control processor, electronically enlarges the cropped image portion (electronic zoom), and displays the enlarged image on the display device 22 such as a color LCD (S105). During this process, in addition to displaying the cropped image overlapping on an initial image of the optical system 1 (an image without zoom), it is also possible to display only the cropped image on the display device 22. By synchronizing the operation of the zoom operation lever 26 and the image displayed on the display device 22, it is possible to obtain an operation feeling as if the zoom lens is actually driven (it should be noted that, at this point, the image of the optical system 1 is electrically processed and the zoom lens of the optical system 2 is not driven), to thereby suppress power consumption for driving the zoom lens when the angle of view is checked, and, consequently, improve operativity by eliminating drive time.

Simultaneously with the cropping process of the image (trimming), the control processor selects and determines an image-capturing optical system according to the amount of operation of the zoom operation lever 26 (S104). Specifically, the selection and determination process is performed according to an algorithm to select and determine an optical system which allows minimum use of the electronic zoom for obtaining a high-quality image. In the first preferred embodiment, the digital camera has the optical system 1 having a fixed focal length and the optical system 2 having a variable focal length. When the angle of view corresponding to the amount of operation of the zoom operation lever 26 is an angle of view which can be optically covered by the optical system 2 (that is, within a range of the optical zoom), the optical system 2 is selected and determined as the image-capturing optical system in the process of S104. When three optical systems including the optical system 1, the optical system 2, and an optical system 3 are provided and the angle of view corresponding to the amount of operation of the zoom operation lever 26 cannot be covered by the optical system 2 but can be covered by the optical system 3, the optical system 3 is selected and determined as the image-capturing optical system in the process of S104. When there is a gap between the ranges of angles of view of the optical system 1 and the optical system 2 (ranges of focal lengths) and the angle of view corresponding to the amount of operation of the zoom operation lever 26 falls within the range of the gap, the optical system 1 is selected and determined as the image-capturing optical system and is used as both the observing optical system and the image-capturing optical system.

After the angle of view (image-capturing area) corresponding to the amount of operation of the zoom operation lever 26 is calculated and an image of the angle of view is displayed on the display device 22 such as the LCD and the optical system to be used as the image-capturing optical system is selected and determined among the plurality of optical systems, the control processor judges whether or not the calculated angle of view according to the zoom operation lever 26 falls within the optical zoom range of the optical system which is selected and determined as the image-capturing optical system (S106). This judgment process can be performed by, for example, setting a flag in the process of step S104 indicating whether or not the angle of view falls within the range of the optical zoom and checking the value of the flag in step S105.

When the angle of view does not fall within the range of the optical zoom; for example, when the angle of view corresponding to the amount of operation of the zoom operation lever 26 is positioned in the gap between the ranges of the angles of view of the optical system 1 and the optical system 2, the control processor displays on the display device 22 that a digital zoom (electronic zoom) is used, in order to notify the user (S107), and asks whether or not the image-capturing operation should be continued (S108). When the user inputs an instruction that the user does not desire image capturing by digital zoom (electronic zoom) (by, for example, operating a cancel button), the process jumps back to step S113 and the digital camera waits for a new input from the zoom operation lever 26.

When in step S106 the angle of view is determined to fall within the range of the optical zoom or when the angle of view does not fall within the range of the optical zoom and the user does not cancel the image capturing process, the user operates the release button 28 to input an image-capturing instruction while checking on the display device 22 that the angle of view is a desired angle of view (S109). The control processor of the image processing system 20 drives the optical axes to change the crossing angle theta of the optical axes from θ1 to θ2 if the distance to the target is shorter than the closest distance L1 at the current crossing angle θ1 between the optical axes (S110), and does not drive to change the crossing angle when the distance to the target is the closest distance L1 or greater, to thereby prepare to capture an image using the optical system selected and determined as the image-capturing optical system (S111). For example, when the optical system 2 is selected and determined as the image-capturing optical system, the distance measurement information and light measurement information obtained by the optical system 1 are used to adjust the zoom lens, focus lens, aperture, etc. of the optical system 2. In response to an operation of the release button in step S109, an image obtained by the optical system 2 is recorded in the storage device 24 as a captured image (S112).

Figure 9:
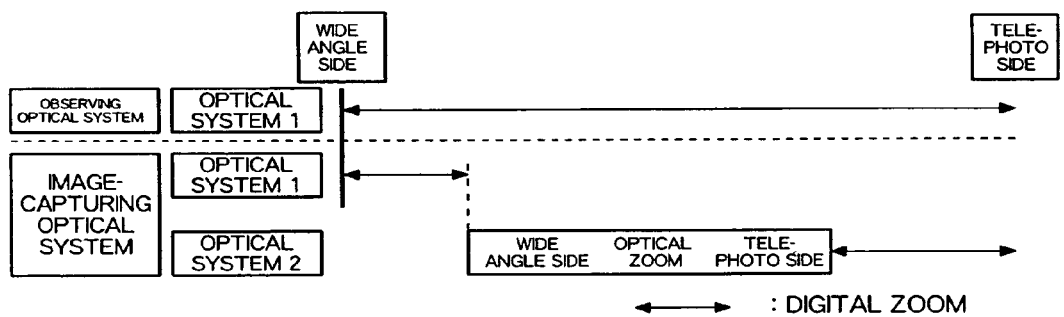
FIG. 9 is a diagram for explaining an observing optical system and an image-capturing optical system according to the first preferred embodiment of the present invention.

FIG. 9 schematically shows switching between the observing optical system and the image-capturing optical system according to the amount of operation of the zoom operation lever 26 in the present embodiment. In the drawing, the upper portion shows the observing optical system, and the lower portion shows the image-capturing optical system. The optical system 1 has the fixed focal length lens 10 and the optical system 2 has the zoom lens 14, with a gap between the angles of view. As described above, the optical system 1, which has a relatively wide angle of view (widest angle of view) is used as the observing optical system. The amount of operation of the zoom operation lever 26 is arbitrarily set between a wide angle end and a telephoto end. In any angle of view, the optical system 1 is selected as the observing optical system. The image-capturing optical system, on the other hand, is changed based on the amount of operation of the zoom operation lever 26. When the angle of view set by the zoom operation lever 26 is at a wider angle side than the wide angle end of the optical zoom of the optical system 2; that is, when the angle of view is positioned within the gap between the angles of view of the optical system 1 and the optical system 2, the optical system 1 is used as the image-capturing optical system. In this case, an electronic zoom process of an image obtained by the optical system 1 is executed. In this case, because both the observing optical system and the image-capturing optical system are the optical system 1 and match, parallax does not need to be considered (it is also possible to execute a cropping process "in consideration of the parallax" by setting the parallax P at 0, but this process is substantially equivalent to a configuration in which parallax is not considered). When, on the other hand, the angle of view set by the zoom operation lever 26 falls within a range of the optical zoom of the optical system 2, the optical system 2 is used as the image-capturing optical system. When the angle of view set by the zoom operation lever 26 is nearer to the telephoto side than is the telephoto end of the optical system 2, the optical system 2 is used as the image-capturing optical system. In this case, an electronic zoom of the image obtained by the optical system 2 is executed.

In this manner, in the present embodiment, the optical system 1 is set as the observing optical system, and a preview image is displayed on the display device 22 by displaying the image obtained by the optical system 1. When the user operates the zoom operation lever 26, trimming and enlarging processes are applied to the image obtained by the optical system 1 serving as the observing optical system. When the user inputs an image-capturing instruction by operating the release button 26, the optical system that can handle the angle of view with the optical zoom is used as the image-capturing optical system according to the amount of operation of the zoom operation lever 26, to thereby capture an image. Thus, images can be efficiently captured using two optical systems.

In the present embodiment, as shown in FIG. 2, the area 102, which is slightly larger than the image-capturing area 104, is displayed in order to help determine the composition. The margin may alternatively be variably set according to the image-capturing mode. That is, the image-capturing modes include a macro mode, a portrait mode, a scene mode, etc., and the size of the area 102 with respect to the image-capturing area 104 may be suitably changed according to these modes.

In the first preferred embodiment, the optical system 1 has the fixed focal length lens 10 and the optical system 2 has the zoom lens 14. Alternatively, there may be employed a configuration in which the fixed focal length lens 10 is changed to a zoom lens so that both the optical system 1 and the optical system 2 are capable of optical zoom processes.

Figure 10:
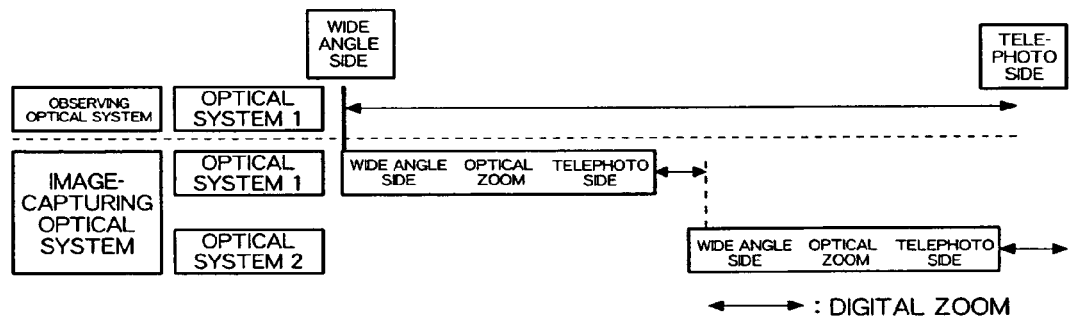
FIG. 10 is a diagram for explaining an observing optical system and an image-capturing optical system according to a second preferred embodiment of the present invention.

FIG. 10 schematically shows switching between the observing optical system and the image-capturing optical system when each of the optical systems 1 and 2 has a zoom lens. The optical zoom range of the optical system 1, and the optical zoom range of the optical system 2 differ from each other, the optical zoom range of the optical system 1 is at a side nearer to the wide angle than is the optical zoom range of the optical system 2, and a gap is present between the optical zoom ranges of the optical systems. Similar to the first preferred embodiment, the optical system 1 having a relatively wide angle of view is used as the observing optical system, regardless of the amount of operation of the zoom operation lever 26. On the other hand, when the angle of view set by the zoom operation lever 26 falls within the optical zoom range of the optical system 1, the optical system 1 is used as the image-capturing optical system. When the angle of view set by the zoom operation lever 26 is positioned within the gap between the optical zoom range of the optical system 1 and the optical zoom range of the optical system 2, the optical system 1 is used as the image-capturing optical system. In this case, an electronic zoom process is applied to an image obtained by the optical system 1. When the angle of view set by the zoom operation lever 26 falls within the optical zoom range of the optical system 2, the optical system 2 is used as the image-capturing optical system. When the angle of view set by the zoom operation lever 26 is at a side nearer to the telephoto side than is the telephoto end of the optical zoom range of the optical system 2, the optical system 2 is used as the image capturing optical system.

Figure 11:
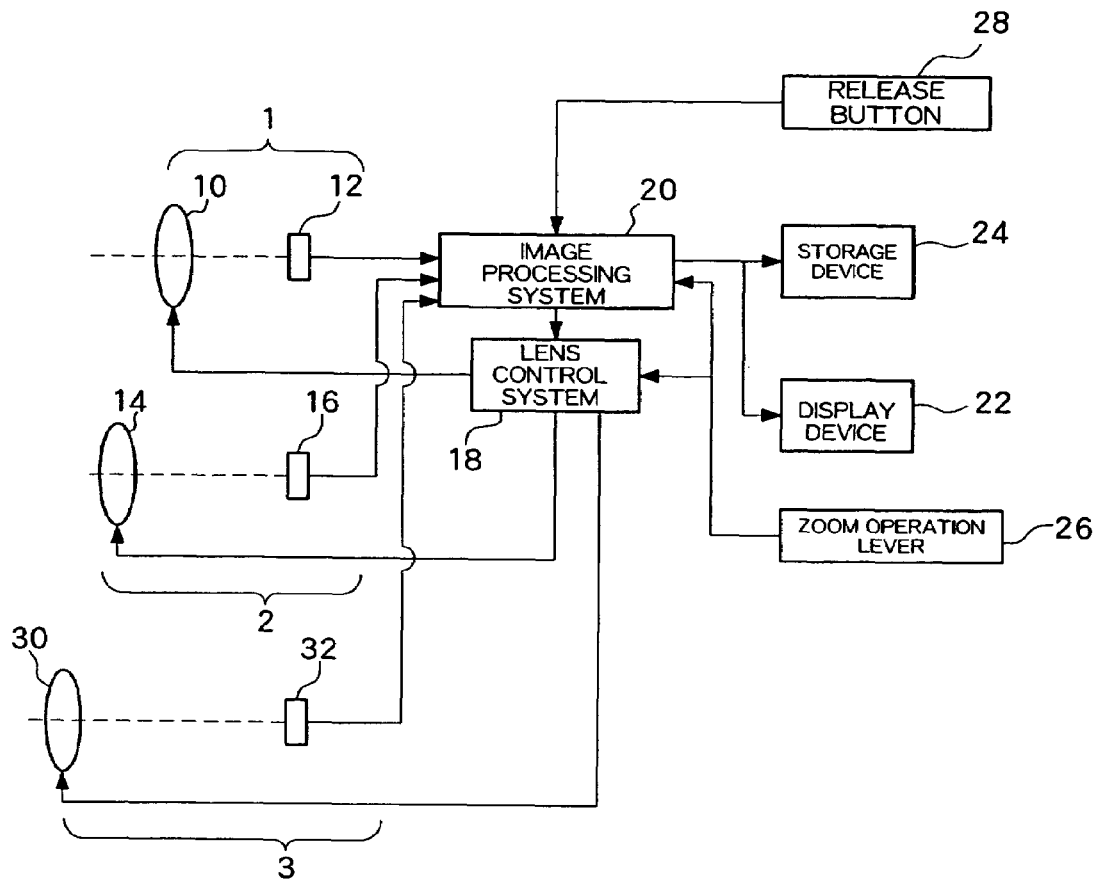
FIG. 11 is a block diagram showing a structure according to a third preferred embodiment of the present invention.

FIG. 11 shows a structure of a digital camera according to a third preferred embodiment of the present invention. The third preferred embodiment differs from the first and second preferred embodiments in that the digital camera has three optical systems, including optical systems 1, 2, and 3.

The optical system 1 has a fixed focal length lens 10 and an image sensor 12, the optical system 2 has a zoom lens 14 and an image sensor 16, and the optical system 3 has a zoom lens 30 and an image sensor 32. The optical system 1 has the widest angle of view, the optical system 2 has a second widest angle of view, and the optical system 3 has the narrowest angle of view. A first image signal from the image sensor 12, a second image signal from the image sensor 16, and a third image signal from the image sensor 32 are supplied to an image processing system 20. A control processor of the image processing system 20 cooperates with an image processor to set the optical system 1 having the widest angle of view as the observing optical system and displays an image cropped from the image obtained by the optical system 1 on a display device 22 according to the amount of operation of a zoom operation lever 26. The control processor selects and determines one of the optical systems 1, 2, and 3 as the image-capturing system according to the amount of operation of the zoom operation lever 26, and stores an image obtained by the selected optical system in a storage device 24 in response to the user's operation of a release button 28. When an image is cropped from an image obtained by the optical system 1 serving as the observing optical system and enlarged according to the amount of operation of the zoom operation lever 26, the image is cropped in consideration of the parallax between the optical systems 1 and 2 and the parallax between the optical systems 1 and 3.

In order to enlarge the range within which the image can be captured by parallax between the optical systems 1 and 2 and parallax between the optical systems 1 and 3, a crossing angle is set between the optical axes of the optical systems 1 and 2 so that the optical axes are not parallel to each other and, similarly, a crossing angle is set between the optical axes of the optical systems 1 and 3 so that the optical axes are not parallel to each other. More specifically, when ½ of the angles of view in the vertical and horizontal directions of the optical system 1 are $\omega v1$ and $\omega h1$, ½ of the angles of view in the vertical and horizontal directions of the optical system 2 are $\omega v2$ and $\omega h2$, and ½ of the angles of view in the vertical and horizontal directions of the optical system 3 are $\omega v3$ and $\omega h3$, the optical axes are set as follows.

Regarding the optical axes of the optical systems 1 and 2, a crossing angle $\theta v12$ on a vertical cross section of the optical axes of the optical systems 1 and 2 is set to $\omega v1 - \omega v2$ ($\theta v12 = \omega v1 - \omega v2$) and a crossing angle $\theta h12$ on a horizontal cross section of the optical axes of the optical systems 1 and 2 is set to $\omega h - \omega h2$ ($\theta h12 = \omega h1 - \omega h2$). Regarding the optical axes of the optical systems 1 and 3, a crossing angle $\theta v13$ on a vertical cross section of the optical axes of the optical systems 1 and 3 is set to $\omega v1 - \omega v3$ ($\theta v13 = \omega v1 - \omega v3$) and a crossing angle $\theta h13$ on a horizontal cross section of the optical axes of the optical systems 1 and 3 is set to $\omega h1 - \omega h3$ ($\theta h13 = \omega h1 - \omega h3$).

When the crossing angles $\theta v12$ and $\theta h12$ of the optical axes are set in this manner regarding the optical systems 1 and 2, the closest distance of an observable target is the longer one of $Lv1 = e/\{\tan \omega v1 - \tan(\omega v2 - \theta v12)\}$ and $Lh1 = e/\{\tan \omega h1 - \tan(\omega h2 - \theta h12)\}$, wherein e represents a distance between the optical systems 1 and 2. Similarly, when the crossing angles $\theta v13$ and $\theta h13$ of the optical axes are set in the above-described manner regarding the optical systems 1 and 3, the closest distance of an observable target is the longer one of $Lv1 = f/\{\tan \omega v1 - \tan(\theta v3 - \theta v13)\}$ and $Lh1 = f/\{\tan \omega h1 - \tan(\omega h3 - \theta h13)\}$, wherein f represents a distance between the optical systems 1 and 3.

Similar to the first preferred embodiment, when the distance to the target becomes shorter than the closest distance, it is possible to correct the crossing angle of the optical axes.

Figure 12:
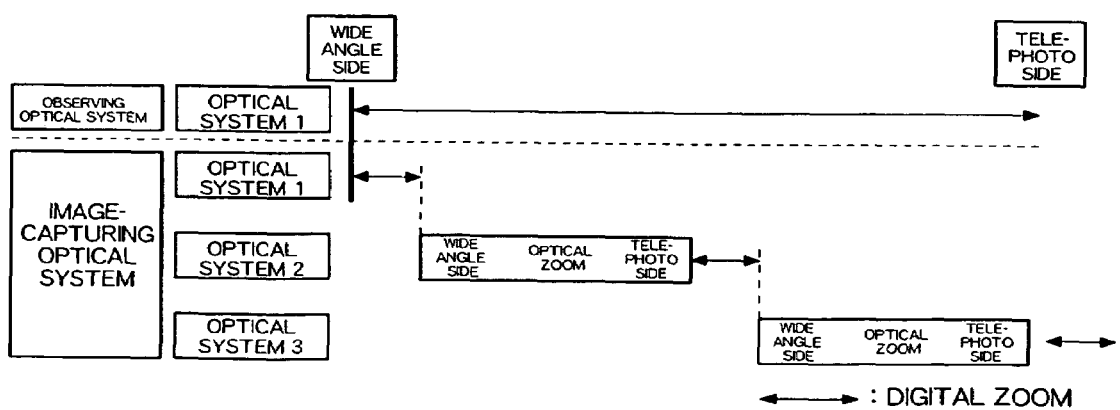
FIG. 12 is a diagram for explaining an observing optical system and an image-capturing optical system in the third preferred embodiment of the present invention.

FIG. 12 schematically shows switching of the observing optical system and the image-capturing optical system in the third preferred embodiment.

The optical system 1 having the widest angle of view is used as the observing optical system regardless of the amount of operation of the zoom operation lever 26. Regarding the image-capturing optical system, on the other hand, the image-capturing optical system is changed according to the amount of operation of the zoom operation lever 26. In other words, when the angle of view set by the zoom operation lever 26 falls within a gap between the angle of view of the optical system 1 and the optical zoom range of the optical system 2, the optical system 1 is used as the image-capturing optical system. When the angle of view set by the zoom operation lever 26 falls within the optical zoom range of the optical system 2, the optical system 2 is used as the image-capturing optical system. When the angle of view set by the zoom operation lever 26 falls within a gap between the optical zoom range of the optical system 2 and the optical zoom range of the optical zoom system 3, the optical system 2 is used as the image-capturing optical system. When the angle of view set by the zoom operation lever 26 falls within the optical zoom range of the optical system 3, the optical system 3 is used as the image-capturing optical system. When the angle of view set by the zoom operation lever 26 is at a position nearer to the telephoto side than is the telephoto end of the optical zoom range of the optical system 3, the optical system 3 is used as the image-capturing optical system.

In the above-described embodiments, an image-capturing area obtained by the image-capturing optical system is cropped from an image obtained by the observing optical system and displayed on the display device 22 according to the user's operation of the zoom operation lever 26. Alternatively, there may be employed a configuration in which the user can arbitrarily change the position of the image-capturing area. For example, a cross-shaped cursor key may be provided at a predetermined position (for example, the rear side) of a digital camera, and the position of the image-capturing area may be changed in response to operation of the cross-shaped cursor key.

Figure 13:
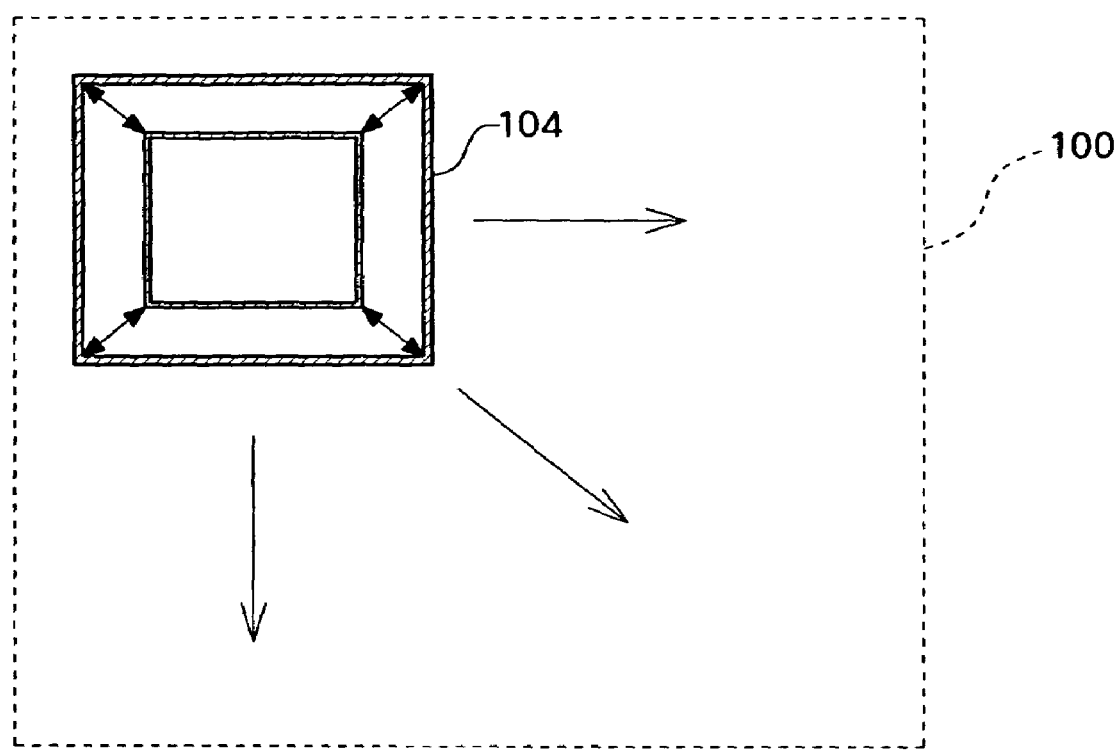
FIG. 13 is a diagram for explaining an angle of view of an observing optical system and an image-capturing area in a fourth preferred embodiment of the present invention.

FIG. 13 shows an example screen of the present embodiment. An image-capturing area 104 is displayed in the angle of view 100 of the observing optical system in an overlapping manner. The image-capturing area 104 is enlarged and reduced in response to an operation of the zoom operation lever 26 and moves vertically and horizontally according to an operation on the cross-shaped cursor key. The control processor and the image processor of the image processing system 20 calculate the image-capturing area based on the amount of operation of the cross-shaped cursor key, and display the image-capturing area on the display device 22. When the user operates the release button 28, the image-capturing optical system is driven to a position corresponding to the calculated image-capturing area, to thereby move the image-capturing optical system to an angle of view and a position of composition corresponding to the image-capturing area, an image is obtained, and the image is stored in the storage device 24.

In this manner, even when the digital camera is fixed on a tripod, for example, a high-quality image in an arbitrary composition can be easily obtained without moving the digital camera itself and while power consumption is suppressed.

Preferred embodiments of the present invention have been described. The present invention, however, is not limited to these embodiments, and various modifications can be made within the scope of the present invention.

For example, in the second preferred embodiment, there is employed a configuration in which the optical zoom ranges of the optical systems 1 and 2 each having a zoom lens differ from each other, but it is also possible to employ a configuration such that the optical zoom ranges of the optical systems 1 and 2 at least partially overlap each other. In this case also, the optical system 1 having a relatively wide angle of view is set as the observing optical system 1, but the image-capturing optical system can be arbitrarily selected. In other words, when the angle of view set by the zoom operation lever 26 falls within the overlapping region between the optical zoom range of the optical system 1 and the optical zoom range of the optical system 2, either one of the optical system 1 and the optical system 2 may be used as the image-capturing optical system. Use of the optical system 1 as the image-capturing optical system has an advantage that the influences of parallax do not need to be considered.

PARTS LIST

1 optical system
2 optical system
3 optical system
10 fixed focal length
12 image sensor
14 zoom lens
16 image sensor
18 lens control system
20 image processing system
22 display device
24 storage device
26 zoom operation lever
27 cross-shaped key
28 release button
30 zoom lens
32 image sensor
100 angle of view
102 angle of view
104 angle of view
d distance
L distance
L1 distance
P parallax
θ crossing angle

What is claimed is:

1. An image-capturing device having multiple optical systems, the image-capturing device including a first optical system having a relatively wide angle of view, a second optical system placed in a certain distance from the first optical system and having a relatively narrow angle of view, and a display unit which displays an image obtained by the first optical system, the image-capturing device comprising:
    a first operation unit which inputs a desired angle of view;
    a display control unit which crops, from an image displayed on the display unit, an image-capturing region calculated in consideration of parallax determined from a desired angle of view input from the first operation unit and a distance between an optical axis of the first optical system and an optical axis of the second optical system and displays the cropped image-capturing region;
    a second operation unit which inputs an image-capturing instruction; and
    a storage unit which stores an image obtained by the second optical system corresponding to the image-capturing region as a captured image in response to an image-capturing instruction input from the second operation unit.

2. An image-capturing device having multiple optical systems according to claim 1, wherein:
    a crossing angle between the optical axes of the first optical system and the second optical system is set to ½ of a difference in angle of view at the widest angles of view of the first optical system and the second optical system.

3. An image-capturing device having multiple optical systems according to claim 1 further comprising:
    a driving unit which changes the crossing angle between optical axes by driving at least one of the optical axes of the first optical system and the second optical system when a distance to a target becomes a predetermined value or smaller.

4. An image-capturing device having multiple optical systems according to claim 1 wherein:
    The display control unit crops and displays the image-capturing region without considering the parallax between the first optical system and the second optical system when the desired angle of view input from the first operation unit falls within an optical zoom range of the first optical system and crops and displays the image-capturing region considering the parallax between the first optical system and the second optical system when the desired angle of view input from the first operation unit falls within an optical zoom range of the second optical system; and
    the storage unit stores an image obtained by the first optical system corresponding to the image-capturing region as the captured image when the desired angle of view input from the first operation unit falls within the optical zoom range of the first optical system and stores an image obtained by the second optical system corresponding to the image-capturing region as the captured image when the desired angle of view input from the first operation unit falls within the optical zoom range of the second optical system.

5. An image-capturing device having multiple optical systems according to claim 4, wherein:
    the optical zoom range of the first optical system and the optical zoom range of the second optical system differ from each other with a gap therebetween;
    the display control unit crops an image corresponding to the image-capturing region and electronically zooms the cropped image without considering the parallax between the first optical system and the second optical system when the desired angle of view input from the first operation unit falls within the gap; and
    the storage unit stores, as the captured image, an image which corresponds to the image-capturing region, which is obtained by the first optical system, and which is electronically zoomed, when the desired angle of view input from the first operation unit falls within the gap.

6. An image-capturing device having multiple optical systems according to claim 4, wherein:
    the optical zoom range of the first optical system and the optical zoom range of the second optical system at least partially overlap each other;
    the display control unit crops and displays an image corresponding to the image-capturing region without considering the parallax between the first optical system and the second optical system when the desired angle of view input from the first operation unit falls within the overlapped range; and the storage unit stores, as the captured image, an image obtained from the first optical system corresponding to the image-capturing region when the desired angle of view input from the first operation unit falls within the overlapped range.

\* \* \* \* \*